US007620199B2

United States Patent
Mihcak et al.

(10) Patent No.: US 7,620,199 B2
(45) Date of Patent: *Nov. 17, 2009

(54) INPUT COMPLEXITY ADAPTIVE QUANTIZATION WATERMARKING

(75) Inventors: M. Kivanc Mihcak, Redmond, WA (US); Yuqun Chen, Bellevue, WA (US); Mariusz Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 807 days.

This patent is subject to a terminal disclaimer.

(21) Appl. No.: 11/196,888

(22) Filed: Aug. 4, 2005

(65) Prior Publication Data

US 2007/0030997 A1    Feb. 8, 2007

(51) Int. Cl.
*G06K 9/00* (2006.01)
*G06K 9/36* (2006.01)

(52) U.S. Cl. ........................................ 382/100; 382/251
(58) Field of Classification Search ................ 382/100, 382/162, 232, 233, 251; 380/201; 713/176
See application file for complete search history.

(56) References Cited

U.S. PATENT DOCUMENTS

| 7,020,775 | B2* | 3/2006 | Mihcak et al. | 713/176 |
|---|---|---|---|---|
| 7,095,873 | B2* | 8/2006 | Venkatesan et al. | 382/100 |
| 7,356,161 | B2* | 4/2008 | Jain et al. | 382/100 |
| 2002/0154778 | A1* | 10/2002 | Mihcak et al. | 380/262 |
| 2004/0001605 | A1* | 1/2004 | Venkatesan et al. | 382/100 |

OTHER PUBLICATIONS

Mihcak et al. ("Blind image watermarking via derivation and quantization of robust semi-global", ICASSP, IEEE Published 2002, pp. 3453-3456.*
Chen et al., "Quantization Index Modulation: A Class of Provably Good Methods for Digital Watermarking and Information Embedding", IEEE, May 2001, vol. 47, No. 4, pp. 1423-1443.

* cited by examiner

*Primary Examiner*—Duy M Dang
(74) *Attorney, Agent, or Firm*—Lee & Hayes, PLLC

(57) ABSTRACT

Systems and methods are described that apply a watermark to data, such as data representing an image. In one implementation, the complexity of the image is measured. A quantization step size is calculated, based in part on the measured complexity of the image. A watermark or message is embedded into the image using the quantization step sizes derived for each coefficient of interest. In a further implementation, a mark decoding system is configured to extract the embedded message from the image data.

18 Claims, 9 Drawing Sheets

100 MARK ENCODING SYSTEM

102 GRAYSCALE TRANSFORM MODULE

104 DWT DECOMPOSITION MODULE

106 ECC ENCODING MODULE

108 INTERLEAVER MODULE

110 COMPLEXITY CALCULATION MODULE

112 QUANTIZATION STEP DERIVATION MODULE

114 MARK-EMBEDDING MODULE

116 INVERSE DWT AND GRAYSCALE TO COLOR MODULE

*Fig. 1*

600 MARK DECODING SYSTEM

602 GRAYSCALE TRANSFORM MODULE

604 DWT DECOMPOSITION MODULE

606 COMPLEXITY AND QUANTIZATION STEP SIZE COMPUTATION MODULE

608 NEAREST NEIGHBOR DECODING (STAGE 1) MODULE

610 NEAREST NEIGHBOR DECODING (STAGE 2) MODULE

612 DE-INTERLEAVING MODULE

614 SOFT DECODING MODULE

*Fig. 6*

INPUT COMPLEXITY ADAPTIVE QUANTIZATION WATERMARKING

TECHNICAL FIELD

The present disclosure generally relates to watermarking, in a context of computers and computer data.

BACKGROUND

In a digital environment, watermarking involves insertion of a pattern of bits into data, such as a digital image, audio or video file. The term is derived by analogy to the watermarks imprinted on higher quality paper stationery. The pattern of bits may be used to protect the data's copyright, to identify a user to whom the data has been assigned or for other purposes.

Unlike watermarked paper stationary, wherein watermarks are intended to be somewhat visible, digital watermarks are intended to be completely invisible, or in an audio implementation, inaudible. Generally, the bits comprising the watermark must be sufficiently interspersed and mixed within the data to avoid identification and/or manipulation by unauthorized third parties. To provide utility, the digital watermark must be robust enough to withstand expected changes to the data, such as reductions from lossy compression algorithms.

Generally, watermarking schemes work by making data associated with the watermark appear as noise of a magnitude below a threshold of human recognition. To view a watermark, a program configured to extract the type of watermark message imprinted upon the data must be used.

While a watermark can be disguised as noise, cautious recipients of the data may attempt to process the data in order to find out the potential presence of a watermark. Where the watermark is poorly disguised, it may be identified, allowing those in possession of the data to act in accordance with that knowledge.

Accordingly, a need exists for better watermarking technology that is adapted to imprint data with watermarks designed to embed as many bits as possible together with implementation efficiency.

SUMMARY

Systems and methods are described that apply a watermark to data, such as data representing an image. In one implementation, the complexity of the image is measured. A quantization step size is calculated, based in part on the measured complexity of the image. A watermark or message is embedded into the image using the quantization step size. In a further implementation, a mark decoding system is configured to extract the watermark message from the image data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 1 illustrates an example of a watermark encoding system.

FIG. 6 illustrates an example of a mark decoding system, within which a watermark is extracted from data.

DETAILED DESCRIPTION

Overview

Figure 2A:
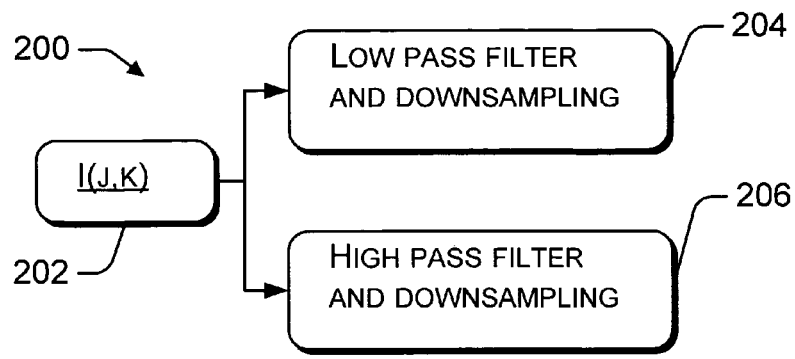
FIGS. 2A-B illustrate an example of concepts utilized in extraction of a DC sub-band from a grayscale image.

The following discussion is directed to systems and methods by which data can be watermarked. In particular, the discussion focuses on image data and the problem of semi-robust image steganography. Suppose, $I_s$ denotes an unmarked original image. We would like to embed L bits into this image using a mark-embedding technique for images. Let $\phi(\cdot)$ and $M \in \{0,1\}^L$ represent the embedder function and the embedded message respectively, and let the embedding be performed using a secret key K. The mark-embedded image is denoted by $I_x(m)$ and is given to the user u(m), i.e., $I_x(m)=\phi(I_s, m, K)$. We assume that there are a total of K users, u(1), u(2), ..., u(K), and each of them is represented by L bits; i.e. $L=\lceil \log_2 K \rceil$. The embedding should be done in such a way that, for all m, $I_s$ and $\{I_x(m)\}$ are perceptually approximately equivalent to each other.

In this discussion, it is assumed that the users $\{u(m)\}$ are told not to disclose their corresponding mark-embedded images $\{I_x(m)\}$ to public. Moreover, the users should not be aware of the fact that they are given mark-embedded versions of the original image $I_s$. Despite the strict requirement of no-disclosure, some of them may leak their version of the mark-embedded images. If that is the case, we would like to track the guilty user(s).

Furthermore, we assume that some conventional signal-processing modifications may be made to the watermark-embedded images during the leakage. For example, we assume that a lossy image compression of the image may occur before it is leaked. Symbolically, let $I_y(m)$ denote the modified version of the image $I_x(m)$. In one embodiment, the semi-robust image steganography system is designed such that the mark-decoder (denoted by $\psi(\cdot)$) performs successfully with high probability even in the presence of such modifications, and is therefore considered to be semi-robust. The decoder and embedder share the secret key K that is unknown to the public. Thus, we would like to design the embedder-decoder pair such that $\Pr[m \neq \Psi(I_y(m), K)]$ is as small as possible for all m.

Exemplary Approach

An initial example is helpful to understand the implementations disclosed later. In the initial example, watermarking is applied to image data using a system that illustrates input complexity adaptive quantization watermarking.

Initially, if the input image is a color image, it is converted to a grayscale image using a standard linear RGB-to-YUV conversion. Here R, G, and B represent the red, green and blue components of a colored input image, and Y represents a corresponding intensity (grayscale) image. The components U and V are the chromatic components. Conversely, if the input image is grayscale, then it is left in that condition. A DWT (discrete wavelet transform) is then applied using a conventional set of wavelet filters. For example, orthogonal Daubechies wavelets of length-8 could be used. In the exemplary approach, mark-embedding is carried out in the DC sub-band derived from 4-level DWT. Alternatively, mark-embedding could be performed using other wavelets, in other sub-bands and using different levels of decomposition. However, the DC sub-band is a reasonably good choice that provides a good tradeoff between perceptual invisibility of the watermark and robustness against compression attacks.

For the actual mark-embedding module, a sufficiently modified variant of QIM (Quantization Index Modulation) can be applied. The bitstream to be embedded (i.e., m) is first passed through an ECC (error correction code) encoder and redundancy is introduced in the resulting bitstream. This is done to increase robustness against attacks. In particular, block repetition codes can be used as the ECC because of both implementation efficiency and the robustness of such codes against cropping attacks. Accordingly, application of ECC to the message m results in creation of a redundant message, c. The redundant bit stream c is passed through a pseudo-random "interleaver" (i.e., a pseudo-random permutation mechanism) to shuffle the bits. Interleaving is a useful countermeasure against "burst error" type modifications (which are typically a result of, for example, cropping type attacks). After interleaving, each DWT DC sub-band coefficient is passed through a "pseudo-random subtractive dithered quantization" process to embed the corresponding bit. In particular, two scalar quantizers can be used (where a codebook of one of the scalar quantizers is a shifted version of the other). For example, quantizer 0 could be used in mark embedding to embed a bit 0, and quantizer 1 could be used to embed a bit 1. The dither amounts may be chosen pseudo-randomly using the secret key K via a secure PRNG (pseudo-random number generator), e.g., RC4. The choice of quantization step sizes is an important aspect. The quantization step sizes are chosen in an input-adaptive way, wherein the quantization step size is adapted according to the local signal complexity. More particularly, the quantization step size may be calculated using the approximate ML (maximum likelihood) estimate of the local variances. The quantization step size for each coefficient can be found as a (typically non-linear) function of the local variances.

A decoder is configured to receive an image and to extract from that image a watermark, or message, m. In this initial example, the decoder is configured to work in a blind way, i.e., while the decoder knows the secret key K, an assumption is made that the decoder does not have access to the original image $I_s$. First, the decoder extracts the DC sub-band of the input (grayscale-converted) image in the same manner as the encoder. Then, using K, the decoder computes the pseudo-random dither values for each coefficient and the signal complexity values. These two quantities uniquely determine the codebooks that will be used by the decoder. Using the derived codebooks, the decoder performs soft decoding, i.e., computes log-likelihood values and decides on either bit 0 or bit 1 by thresholding the resulting log-likelihood. (In this way, the decoder effectively solves a binary hypothesis-testing problem to decode each bit.)

Experimental evidence shows that with the proper choice of the parameters, the resulting embedder & decoder functions result in mark-embedded images that appear approximately the same as the original images. Moreover, such watermarked images are robust to JPEG compression with a quality factor as low as 50%, under typical circumstances wherein the image has sufficient complexity.

Exemplary Encoding Environment

FIG. 1 illustrates an example of a mark-encoding system 100. Embodiments of the mark-encoding system 100 may be adapted to applying watermarks to data files, and in particular, to applying a watermark to a data file wherein the data file contains an image. The implementation 100 of the mark encoding system 100 includes eight (8) principle software modules 102-116, each of which is related to one or more processes by which the mark (i.e. the watermark or message) is encoded. An alternate implementation of the mark-encoding system 100 could distribute the same or similar functionality among the same or a different number of software, firmware and/or hardware structures (e.g. application specific integrated circuits). Accordingly, the example of FIG. 1 illustrates an implementation of the mark-encoding system 100 that is preferred for its operational and teaching characteristics.

A grayscale transform module 102 is configured to receive a color image and to find its grayscale representation. For example, the grayscale transform module 102 is configured to receive a color image $I_s$ and to find its grayscale representation. In one embodiment, this is performed using a linear mapping from a color system such as RGB (red, green, blue) to a grayscale system such as YUV, wherein the Y component gives the grayscale representation and U and V are chromatic components. Similarly, mappings from RGB to YCrCb can be used; furthermore, potentially non-linear mappings from the color space to the grayscale intensity space can be employed.

The grayscale transform module 102 can be configured to convert a "color" pixel to its grayscale representation. The conversion may be performed as desired, such as by means of a linear mapping. In one example, the mapping can be performed by operation of the representative equation, below:

$$\begin{bmatrix} Y \\ U \\ V \end{bmatrix} = \begin{bmatrix} 0.299 & 0.587 & 0.114 \\ 0.596 & -0.274 & -0.322 \\ 0.211 & -0.523 & 0.311 \end{bmatrix} \cdot \begin{bmatrix} R \\ G \\ B \end{bmatrix}. \quad \text{(Eq. 1)}$$

The grayscale transform module 102 therefore produces an output grayscale image associated with a color input image. Additionally, the chromatic components U and V are saved for later use in producing a mark-embedded color image.

Figure 2B:
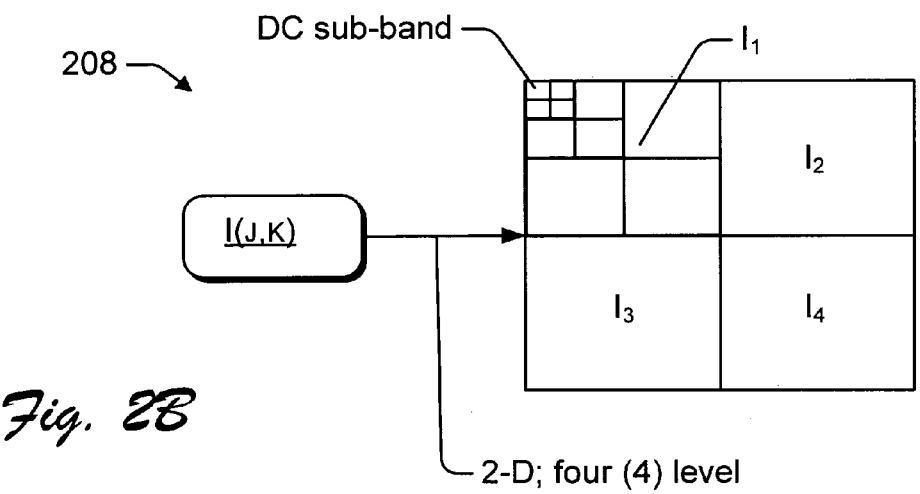

A DWT decomposition module 104 is configured to extract a 'high-energy' DC sub-band from the grayscale image produced by the grayscale transform module 102. The DWT decomposition module 104 is configured to apply a DWT (discrete wavelet transform) to the grayscale image one or more times. The DWT decomposition module 104, in the example of FIG. 1, applies the two-dimensional DWT four times, resulting in four levels of decomposition. Referring briefly to FIG. 2A, aspects of an exemplary discrete wavelet transform can be seen. A filtering system 200 is configured to receive an input image I 202 and to separate the image into higher and lower energy portions by operation of low-pass and high-pass filters (subsequently followed by down-sampling) 204, 206, respectively. By repeatedly passing, for example, the output of the low pass filter after down-sampling, through the filters 200, progressively lower-frequency, higher energy, portions of the image may be obtained. In particular, FIG. 2B shows the results 208 of passing the image data (or portions thereof) through the low pass filtering followed by down-sampling system 200 a total of four (4) times. Thus, FIG. 2B shows a 2-dimensional, four (4) level decomposition of the image I. The DC sub-band is the portion of the image to which the watermark embedding is (preferably)

applied at the encoder and watermark decoding (preferably) is applied at the decoder. Alternatively, other sub-bands may also be used in the implementation. Note that the number of levels—each resulting from applying the pair of low-pass and high-pass filters followed by down-sampling—is somewhat arbitrary. However, not using high-frequency, low-energy, portions of the image sub-bands for watermarking purposes generally yields better results.

Accordingly, the DWT decomposition module 104 is configured to apply one or more levels of DWT decomposition to a grayscale image, and extract the DC sub-band. The DC sub-band can be called s, and the dimension of s can be assumed to be $N_1 \times N_2$, and the total number of samples in the DC sub-band is defined as $N \triangleq N_1 \cdot N_2$. In one embodiment, 4-level DWT decomposition is used. Other levels of decomposition may alternatively be used. In general, more levels of decomposition result in a more robust sub-band having better resistance to compression. However, the payload (i.e. the length of message which may be inserted) decreases with each additional level of decomposition. In the embodiment described, Daubechies length-8 wavelets were used in the decomposition. Alternatively, it is possible to employ other types of wavelets or filter banks.

An ECC (error correcting code) encoding module 106 is configured to embed an ECC into a message, m, that is being used to watermark an image, I. In the example of FIG. 1, a block repetition code is used as the ECC; however, alternate ECC codes could be used. For example, given the message $m \in \{0,1\}^L$ that we would like to embed in the image I, the ECC encoder 106 can be configured to generate a redundant message, called $c \in \{0,1\}^N$, using the following relationship (assuming that L<<N):

$$c((i-1) \cdot (N/L) + j) = m(i), 1 \leq j \leq N/L, 1 \leq i \leq L. \quad (Eq. 2)$$

In this example, a block repetition code of rate N/L, was used, and an assumption was made that N/L is a positive integer. However, the assumption of $N/L \in Z^+$ is a flexible assumption. A more general relationship is given as follows: Suppose we have $$N = L_1 \cdot Q_1 + L_2 \cdot Q_2,$$

$$Q_1 \triangleq \left\lceil \frac{N}{L} \right\rceil$$

$$Q_2 = \triangleq \left\lfloor \frac{N}{L} \right\rfloor$$

and $L_1 + L_2 = L$. Then, if $1 \leq i \leq L_1$, we have $$c((i-1) \cdot Q_1 + j) = m(i), 1 \leq j \leq Q_1, \quad (Eq. 3)$$

else, (i.e., if $L_1 < i \leq L$), we have $$c((i-1-L_1) \cdot Q_2 + j + L_1 \cdot Q_1) = m(i), 1 \leq j \leq Q_2. \quad (Eq. 4)$$

Note that Equations 3 and 4 constitute a generalized version of Equation 2 for the case of $N/L \in Z^+$.

An interleaver module 108 is configured to random interleave (i.e., apply a random permutation) to c (the message m, having ECC applied) to produce $d \in \{0,1\}^N$, an interleaved message. More precisely, the interleaver module 108 produces $d = \Pi_K(c)$, where $\Pi_K(\cdot)$ denotes a key-based interleaver operator. Additionally, having produced d, the interleaver module 108 is configured to reorder d such that it is in the form a binary matrix of size $N_1 \times N_2$ (i.e., same size as s, where s is the DC sub-band extracted from I by the DWT decomposition module 104).

A complexity calculation module 110 is configured to receive the unmarked signal s and to compute its "complexity map." Complexity is important because it governs how much data (e.g. watermark) can be inserted into areas of the image without causing a visible artifact. Furthermore complexity also indicates the maximum amount of watermark strength one can introduce into the image without causing perceptually annoying artifacts. In one embodiment, the complexity map derivation module 110 computes complexity measures for each pixel s(i,j) within the sub-band according to each pixel's local standard deviation. The local standard deviation, denoted for each pixel s(i, j) by $\sigma_s(i, j)$, is computed within a window of size W×W. For example, the computation of the complexity may be calculated as a local standard deviation, according to:

$$\sigma_s(i, j) \triangleq \frac{1}{W'(i, j)} \sum_{k=max(i-W,1)}^{min(i+W,N_1)} \sum_{l=max(j-W,1)}^{min(j+W,N_2)} [s(k, l) - \bar{s}(i, j)]^2, \quad (Eq. 5)$$

where $$\bar{s}(i, j) \triangleq \frac{1}{W'(i, j)} \sum_{k=max(i-W,1)}^{min(i+W,N_1)} \sum_{l=max(j-W,1)}^{min(j+W,N_2)} s(k, l), \quad (Eq. 6)$$

and $$W'(i, j) \triangleq \quad (Eq. 7)$$
$$|\{max(i-W, 1), max(i-W, 1)+1, \ldots, min(i+W, N_1)\} \times$$
$$\{max(j-W, 1), max(j-W, 1)+1, \ldots, min(j+W, N_2)\}|.$$

Figure 3:
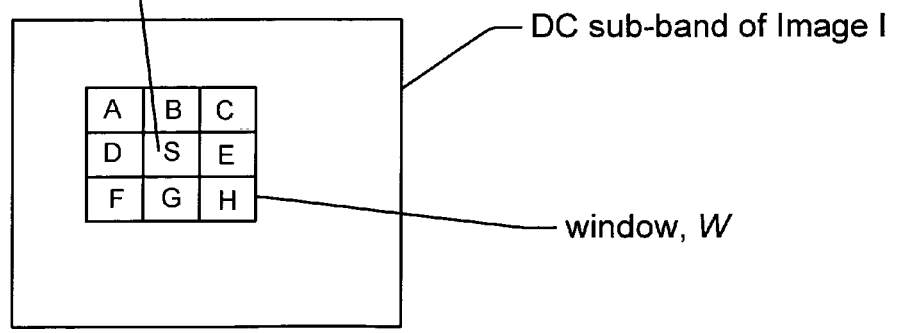
FIG. 3 illustrates an example of concepts utilized in measuring complexity of data, such as within an image.

Referring briefly to FIG. 3, a simplified diagram illustrates aspects of the above equations. In particular, the DC sub-band, s, of an image, I, contains a window, W. Within the window, a pixel s(j, k) (one pixel from within the DC sub-band denoted by the letter S in FIG. 3) is surrounded by additional pixels, A-H, within the window W. The window W, having dimensions W×W, is analogous to elements within the above equations used in calculating the standard deviation of s(j, k) (in FIG. 3, the case of W=3 is shown for illustration purposes). The above equation and diagram illustrates one pixel s(j, k) within s, is associated with its own window W, configured for calculation of a local standard deviation for each pixel within s. By extension, a complexity value in the form of a local standard deviation of each pixel s(j, k) within s, is calculated in a similar manner. While the complexity of each point s(j, k) within s is calculated as a local standard deviation by the complexity calculation module 110, other measures of the complexity could also be calculated. Regardless of the manner in which complexity of s is measured, such measurements provide insight that governs how much watermark data may be inserted into a part of an image without creating a noticeable artifact.

Note that for most cases (except for border conditions), the limits of the summations in Equation 5 are i−W and i+W, which implies $W'(i,j) = W^2$ for most (i, j). Similarly, in boarder conditions, the limits of the summations for Equation 6 are j−W and j+W.

Returning to FIG. 1, a quantization step derivation module 112 is configured to derive quantization step sizes using a complexity map or values obtained from the complexity calculation module 110. The quantization step size governs how much, or how far, elements of data within the DC sub-band s can be rounded by the mark-embedding module 114 as a message d is added to s. In one implementation of the quantization step derivation module 112, for each coefficient s(i, j), the step size of base quantizer is selected using the following complexity-based rule: If $\sigma_s(i, j) < \sigma_{MAX}$, then $$\Delta_s(i, j) = \frac{\sigma_s(i, j)}{\sigma_{MAX}} \cdot \Delta_{MAX},$$

otherwise, chose $\Delta_s(i, j) = \Delta_{MAX}$. Here, $\sigma_{MAX}$ and $\Delta_{MAX}$ are user-defined input parameters to the algorithm.

In the implementation of FIG. 1, the input parameters were selected as W=3, $\Delta_{MAX}$=20.0, $\sigma_{MAX}$=200.0. However, these values could be adjusted to meet the needs of any particular application. In particular, note that these parameters can be chosen experimentally and are specifically geared towards using 4-level DWT decomposition with Daubechies length-8 wavelets.

Figure 4:
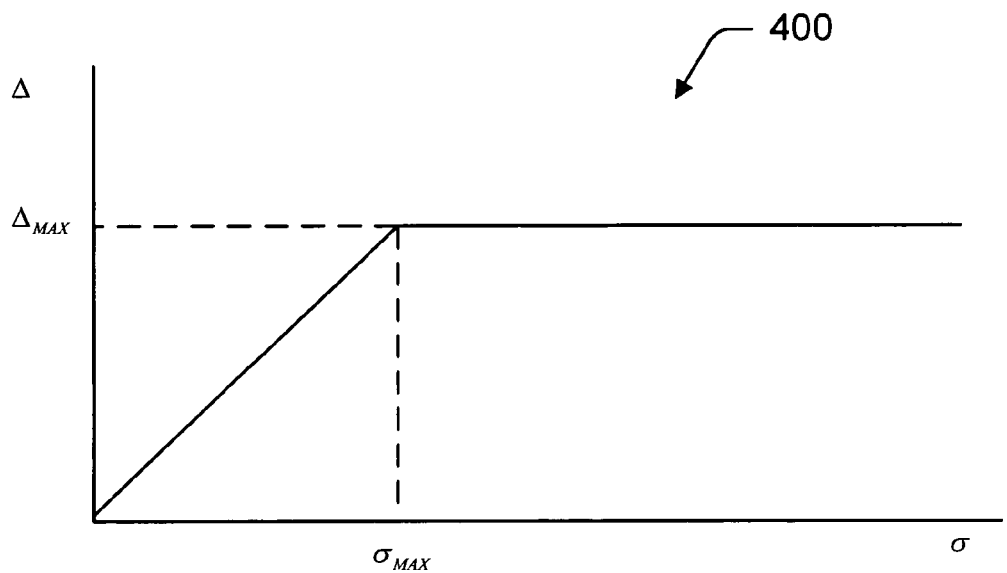
FIG. 4 illustrates an example of concepts utilized in calculating a quantization step size.

Referring briefly to FIG. 4, an exemplary relationship 400 between the complexity measure (in this example the local standard deviation, $\sigma$) and the quantization step size, $\Delta$. This relationship is exemplary of other similar relationships between the complexity measure and the quantization step size. In particular, FIG. 4 illustrates that the quantization step size $\Delta$ is held to a maximum value of $\Delta_{MAX}$, to prevent the generation of artifacts by the mark-embedding module 114. Additionally, the increasing portion of the graph 400 of FIG. 4 illustrates that (to a point, i.e., $\sigma_{MAX}$) additional complexity (i.e. a greater $\sigma$ value) justifies a greater quantization step size (i.e. greater $\Delta$). This is intuitive, in that a more complex image can hide more message data without resulting in generation of artifacts.

Returning to FIG. 1, a mark-embedding module 114 is configured to embed a watermark into the DC sub-band s. In the implementation of FIG. 1, the mark-embedding module uses a subtractive dithered quantization method. In particular, the mark-embedding module 114 carries out the mark-embedding process on s, thereby forming the mark-embedded DC sub-band, which is denoted by x and sized according to $N_1 \times N_2$. Recall that the interleaver module 108 applied a random permutation to c (the message m, having ECC applied) to produce $d \in \{0,1\}^N$, an interleaved message. The mark-embedding module 114 embeds d within DC sub-band s using the quantization step size $$\Delta_s(i, j) = \min\left(\sigma_s(i, j) \frac{\Delta_{MAX}}{\sigma_{MAX}}, \Delta_{MAX}\right),$$

based in part on the complexity calculated by the complexity calculation module 110. In the implementation of FIG. 1, the mark-embedding module 114 embeds d within the DC sub-band s to create x as follows:

If d(i, j)=0, then, $x(i, j) = Q_{\bar{\Delta}_s(i,j)}(s(i, j) + r(i, j)) - r(i, j)$, otherwise (i.e., d(i,j)=1), $x(i, j) = Q_{\bar{\Delta}_s(i,j)}(s(i,j) + r(i, j) - \Delta_s(i, j)) - r(i, j) + \Delta_s(i, j)$, where $\bar{\Delta}_s(i, j) \underline{\underline{\Delta}} 2 \cdot \Delta_s(i, j)$ and $Q_\Delta(\cdot)$ denotes uniform scalar quantization operator with step size $\Delta$, i.e. $Q_\Delta(a) \underline{\underline{\Delta}} [a/\Delta] \cdot \Delta$.

Here, [·] denotes a 'rounding to the nearest integer' operation. Furthermore, for all (i, j), r(i, j) is a randomly-uniformly generated number from the domain of $[0, \bar{\Delta}_s(i, j)]$.

Figure 5:
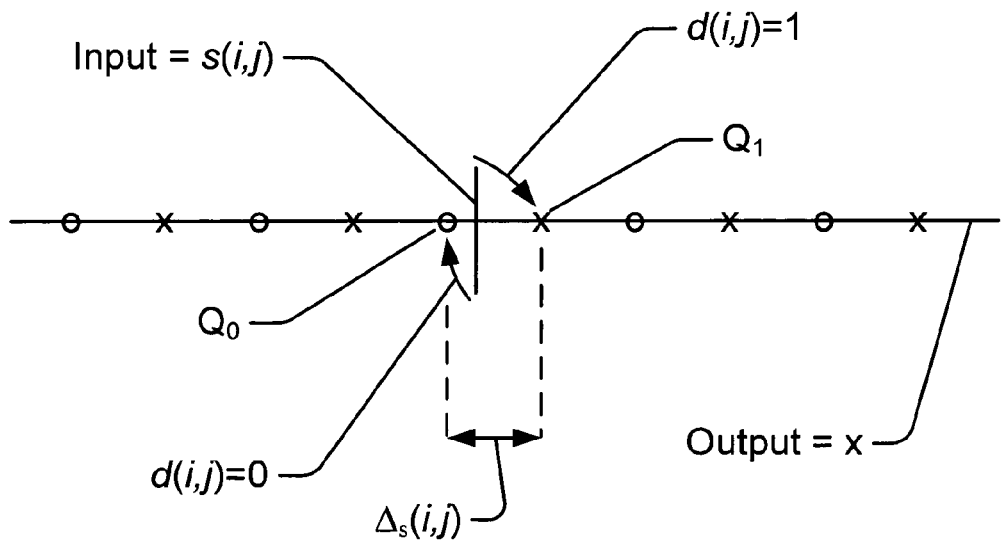
FIG. 5 illustrates an example of concepts utilized in embedding a message into data.

Referring briefly to FIG. 5, an intuitive understanding of operation of the mark-embedding module 114 is facilitated. An input value s is associated with an arbitrarily selected value s(i, j) from within the DC sub-band, s. The mark-embedding module 114 is configured to impart a message d(i,j) to the value s(i,j) by either moving s(i,j) to an adjacent cross ("x") if d(i,j)=1, or to an adjacent circle ("o") if d(i,j)=0. Thus, two quantizers, $Q_0$ and $Q_1$ are provided in this one-dimensional example. Note that the crosses and circles are separated by a distance $\Delta_s$ that is associated with the quantization step derived by the quantization step module 112. Also, note that the crosses are distinct from the output, x, which is the output of the mark-embedding module 114 (i.e. x is the DC sub-band s after application of the randomly interleaved message d, which was derived from the ECC-containing message c, which in turn was derived from the original message, m). Thus, in the example of FIG. 5, while the input value s(i,j) was originally between a cross and a circle, after application of the mark-embedding module, that value will be moved to either the cross or the circle, depending on if a 1 or a 0 is to be embedded, respectively. Note that in either case, the movement of the data is less than the value $\Delta_s(i,j)$.

An inverse DWT and grayscale to color module 116 is configured to inverse the DWT Transformation applied by the DWT decomposition module 104 and to reverse color to grayscale transformation of the grayscale transform module 102. In particular, given x, the DC sub-band having embedded message d created by the mark-embedding module 114, the inverse DWT and grayscale to color module 116 carries out inverse-DWT to obtain the grayscale watermarked image. If the original input image $I_s$ was a colored image, the original chromatic components U and V, obtained from the grayscale transform module 102, together with the grayscale watermarked image, are used to construct $I_x$. Otherwise, (i.e. if $I_s$ was a grayscale image), $I_x$ is equal to the grayscale watermarked image.

In one example, the inverse DWT and grayscale to color module 116 may be configured to map a grayscale image to a color format using the following equation:

$$\begin{bmatrix} R \\ G \\ B \end{bmatrix} = \begin{bmatrix} 1.000 & 0.956 & 0.621 \\ 1.000 & -0.272 & -0.647 \\ 1.000 & -0.106 & 1.703 \end{bmatrix} \cdot \begin{bmatrix} Y \\ U \\ V \end{bmatrix}. \quad \text{(Eq. 8)}$$

Exemplary Decoding Environment

FIG. 6 illustrates an example of a mark-decoding system 600. Embodiments of the mark-decoding system 600 may be adapted to extracting watermarks from data files, and in particular, to extracting a watermark from a data file wherein the data file contains an image. The implementation 600 of the mark-decoding system 600 includes seven (7) principle software modules 602-614, each of which is related to one or more processes by which the mark is extracted. An alternate implementation of the mark-decoding system 600 could distribute the same or similar functionality among the same or a different number of software, firmware and/or hardware structures (e.g. application specific integrated circuits). Accordingly, the example of FIG. 6 illustrates an implementation of the mark-decoding system 600 that is preferred for its operational and teaching characteristics.

A grayscale transform module 602 is configured to conversion input data (e.g. an image) to grayscale. In an example, given an input image $I_y$, if the image is a colored image, its grayscale representation may be found using the linear mapping from RGB to YUV. The Y component gives the grayscale representation. This transform may be made in a manner similar to that seen in the operation of the grayscale transform module 102, using Equation 1. Accordingly, the grayscale transform module 602 may operate substantially similar to the grayscale transform module 102.

A DWT decomposition module 604 is configured to apply DWT decomposition to the grayscale image produced by the grayscale transform module 602, and to extract the DC sub-band. The DC sub-band can be denoted by y, and the dimension of y can be defined as $N_1 \times N_2$. Additionally, we define $N \triangleq N_1 \cdot N_2$. Note that if y is not of size $N_1 \times N_2$, which is the same size that was used at the embedder, it is interpolated to that size. Also note that the operation of the DWT decomposition module 604 may operate substantially similar to the DWT decomposition module 104.

A complexity and quantization computation module 606 essentially reverses the operation of the quantization step derivation module 112. In the example of FIG. 6, the complexity and quantization computation module 606, given the received signal y, computes its "complexity map," where the complexity of each coefficient y(i, j) is given by its local standard deviation (denoted by $\sigma_y(i, j)$) within a window of size W×W). In particular, $$\sigma_y(i,j) \triangleq \frac{1}{W'(i,j)} \sum_{k=max(i-W,1)}^{min(i+W,N_1)} \sum_{l=max(j-W,1)}^{min(j+W,N_2)} [y(k,l) - \bar{y}(i,j)]^2 \quad \text{(Eq. 9)}$$

where $$\bar{y}(i,j) \triangleq \frac{1}{W'(i,j)} \sum_{k=max(i-W,1)}^{min(i+W,N_1)} \sum_{l=max(j-W,1)}^{min(j+W,N_2)} y(k,l) \quad \text{(Eq. 10)}$$

and W'(i, j) was defined in Equation 7. Note that the operations of Equations 9 and 10 have the same functional form as Equations 5 and 6; here the input is y instead of s. Then, the complexity and quantization step size computation module 606, in a manner that is analogous to operation of the complexity calculation module 110 of the mark-encoding system 100 of FIG. 1, computes the corresponding base quantization step sizes. For example, if $\sigma_y(i, j) < \sigma_{MAX}$, then $$\Delta_y(i,j) = \frac{\sigma_y(i,j)}{\sigma_{MAX}} \cdot \Delta_{MAX},$$

otherwise $\Delta_y(i, j) = \Delta_{MAX}$.

In the example of FIG. 6, nearest neighbor decoding is divided into first and second stages, 608-610, in part for purposes of illustration. Collectively, the first and second stage extract information inserted into the image by the mark-embedding module 114, and produces an input to a de-interleaving module 612. A nearest neighbor decoding module 608 is configured for the first stage. At stage one, the closest neighbors to y (called $y^0$ and $y^1$ respectively) are determined using bit-0 and bit-1 quantizers. In particular:

$$y^0(i,j) \triangleq Q_{\bar{\Delta}_y(i,j)}(y(i,j)+r(i,j)) - r(i,j), \quad \text{(Eq. 11)}$$

and $$y^1(i,j) \triangleq Q_{\bar{\Delta}_y(i,j)}(y(i,j)+r(i,j)-\Delta_y(i,j)) - r(i,j) + \Delta_y(i,j) \quad \text{(Eq. 12)}$$

where $\bar{\Delta}_y(i,j) \triangleq 2 \cdot \Delta_y(i,j)$ and $Q_\Delta(\cdot)$ was defined in the mark-embedding module 114 of the embedding system 100; and the $\{r(i, j)\}$ are generated in the same way as it was explained in mark-embedding module 114 of the embedding system 100 (except that $\{\Delta_y(i, j)\}$ are used instead of $\{\Delta_s(i, j)\}$). The secret key K is used as the seed of a secure PRNG in generating $\{r(i, j)\}$. Note that the same secret key was used at the encoder to generate $\{r(i, j)\}$, this is necessary to maintain synchronization between encoder and decoder.

A nearest neighbor decoding module 610 is configured to perform the second stage of the message extraction process. At stage two the $L^2$ norm error matrices $e^0$ and $e^1$ are derived, for $y^0$ and $y^1$ respectively, using the following relationships: For all (i,j), $$e^0(i,j) \triangleq [y(i,j) - y^0(i,j)]^2,$$

and $$e^1(i,j) \triangleq [y(i,j) - y^1(i,j)]^2.$$

A de-interleaving module 612 is configured to reverse the permutation mapping that was applied by the interleaver module 108 of the mark encoding system 100. In particular, "de-interleaving" is applied to the matrices $e^0$ and $e^1$, created by the nearest neighbor decoding module 610, thereby forming $f^0$ and $f^1$ respectively, as seen below:

$f^0 \triangleq \Pi_K^{-1}(e^0)$ and $f^1 \triangleq \Pi_K^{-1}(e^1)$; wherein $\Pi_K(\Pi_K^{-1}(\cdot)) = \Pi_K^{-1}(\Pi_K(\cdot))$ denote the identity mapping.

A soft decoding module 614 is configured to extract the embedded bits as reliably as possible and to match the ECC encoding module 106 of the mark encoding system 100. The example of FIG. 6 shows the decoding that corresponds to a block repetition code structure. In this example, the soft decoding module 614 is configured to first reorder $f^0$ and $f^1$ to be in the vector form, having length $N = N_1 \cdot N_2$. Assuming that N/L is a positive integer, compute:

$$g^0(i) = \sum_{j=1}^{N/L} f^0((i-1) \cdot (N/L) + j), \quad 1 \le i \le L,$$

and $$g^1(i) = \sum_{j=1}^{N/L} f^1((i-1) \cdot (N/L) + j), \quad 1 \le i \le L.$$

Then, $\hat{m}(i)=0$ if $g^0(i) < g^1(i)$, where $1 \le i \le L$. And, $\hat{m}(i)=1$ if $g^1(i) < g^0(i)$, where $1 \le i \le L$. Here (the vector) $\hat{m}$ denotes the length-L decoded bit stream.

Conversely, if $N/L \in Z^+$, an analogous scheme is applied from the previous discussion. Note that in the absence of attacker modifications, it is clearly true that, for all (i, j), y(i, j)=x(i, j), which leads to $e^0(i, j)=0$ and $e^1(i, j)=\Delta_s^2(i, j)$ if d(i, j)=0. And, for all (i, j), y(i, j)=x(i, j), which leads to $e^1(i,j)=0$ and $e^0(i,j)=\Delta_s^2(i,j)$ if d(i,j)=1. Deviations from this may occur because of intentional or unintentional attacks and/or modifications to the watermarked image.

Exemplary Methods

Exemplary methods for implementing aspects of input complexity-adaptive quantization watermarking will now be described with occasional reference to the structures disclosed by FIGS. 1 and 6. Accordingly, the methods apply generally to the operation of exemplary components discussed above with respect to FIGS. 1 and 6, but could be applied by analogy to the operation of alternatively designed encoding and decoding systems. The elements of the described methods may be performed by any appropriate means including, for example, hardware logic blocks on an ASIC or by the execution of processor-readable instructions defined on a processor-readable medium. A "processor-readable medium," as used herein, can be any means that can contain or store instructions for use by or execution by a processor. A processor-readable medium can be, without limitation, an electronic, magnetic, optical, electromagnetic, infrared, or semiconductor system, apparatus or device. More specific examples of a processor-readable medium include, among others, a portable computer diskette, a random access memory (RAM), a read-only memory (ROM), an erasable programmable-read-only memory (EPROM or Flash memory), a rewritable compact disc (CD-RW), and a portable compact disc read-only memory (CDROM).

Figure 7A:
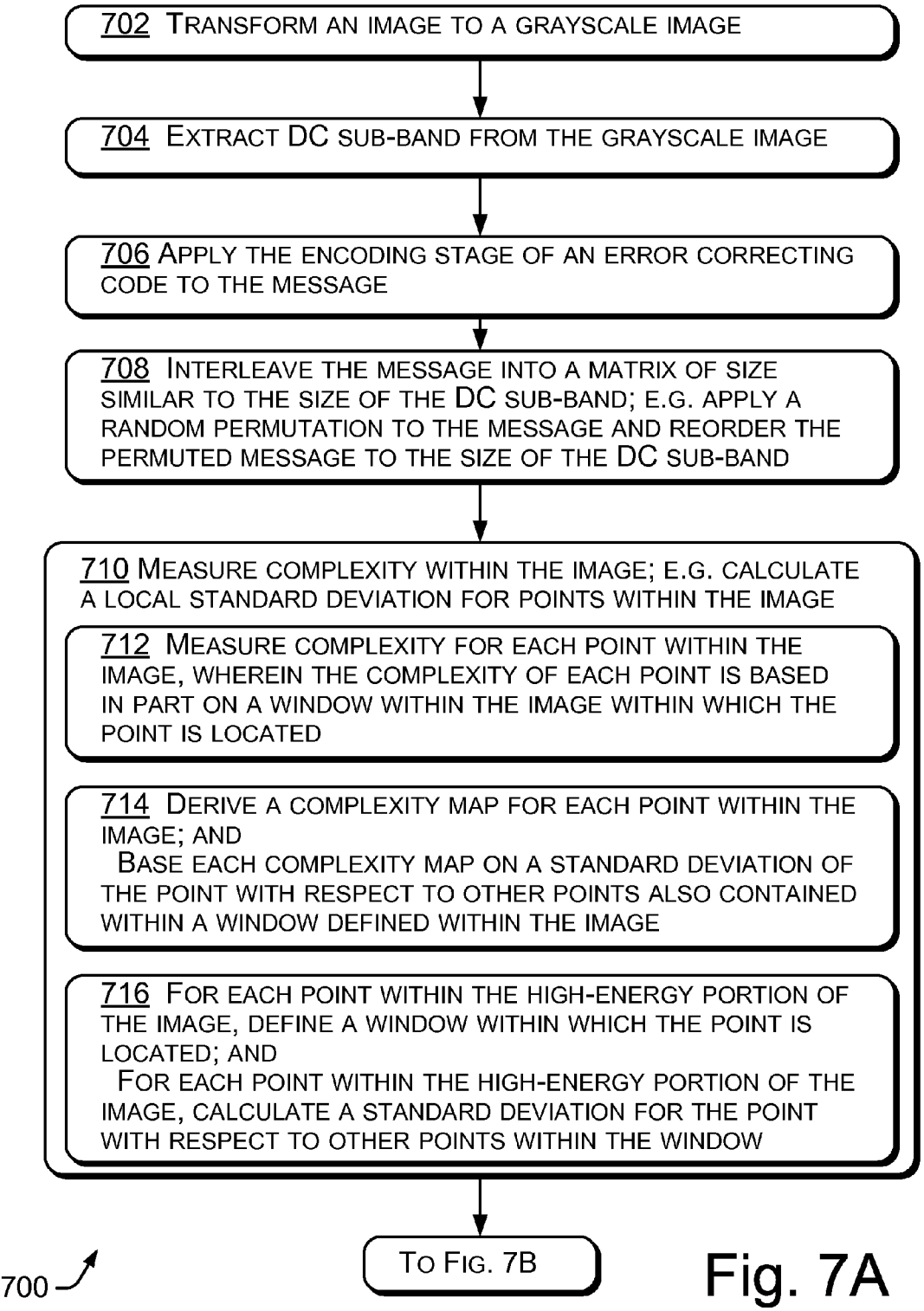
FIGS. 7A-C illustrate an example of operation of a watermark encoding system.
Figure 7B:
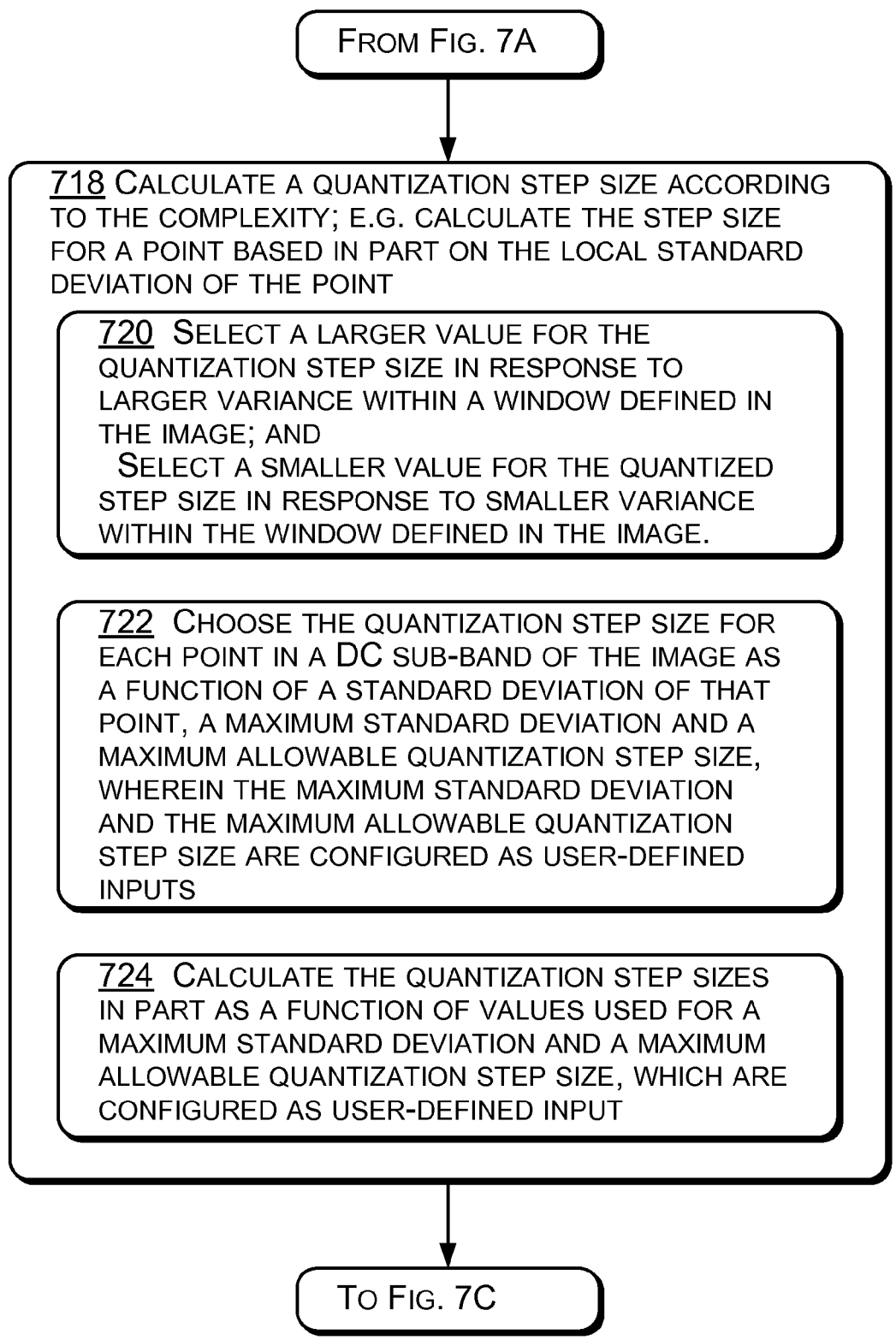
Figure 7C:
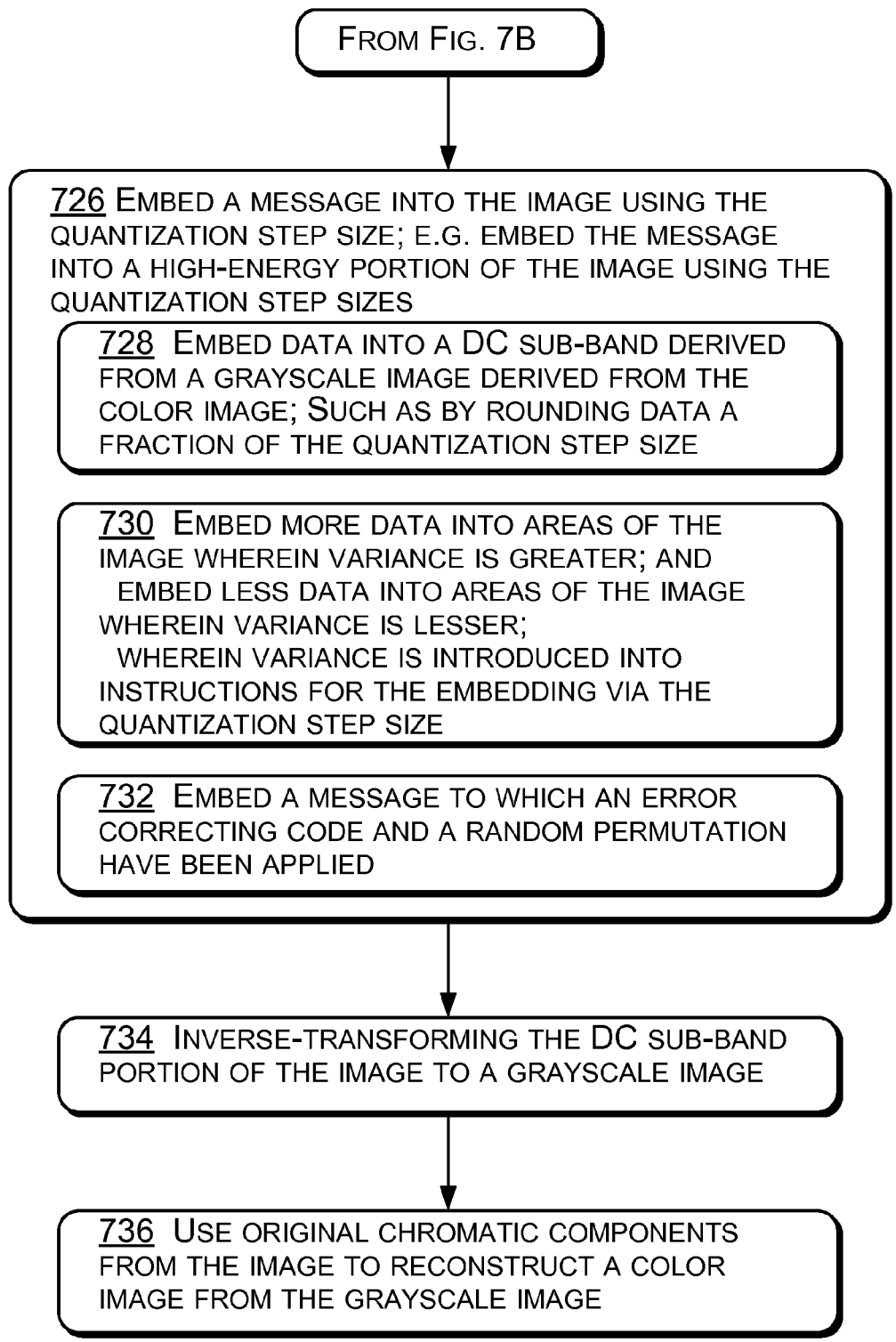

FIGS. 7A-C illustrate an example of a method 700 by which the watermark encoding system 100 of FIG. 1 may be operated. Thus, FIGS. 7A-7C show how a message m may be altered and then inserted into data (e.g. an altered form of an original color image data), thereby watermarking the data (or image). At block 702, an image is transformed into a grayscale image. As an example, in FIG. 1 a color image input to the mark encoding system 100 is converted into a grayscale image by the grayscale transform module 102. Equation 1 shows a particular mapping by which this operation may be performed. At block 704, a DC sub-band is extracted from the grayscale image produced at block 702. In the example of FIG. 1, the discussion of the DWT decomposition module 104 disclosed structures and operation configured to extract the DC sub-band from the grayscale image produced by the grayscale transform module 102. At block 706, the encoding stage of an error correcting code (ECC) is applied to the message. In the example of FIG. 1, the ECC encoding module 106 applies a block repetition code to the message m, thereby producing a message c. At block 708, the message c is interleaved, producing a matrix of a size similar to the DC sub-band. Referring to FIG. 1, the interleaver module 108 is configured to perform the interleaving. For example, a random permutation may be applied to the message c, which is reordered to the size of the DC sub-band.

At block 710, complexity within the DC sub-band of the image is measured. In the example of FIG. 1, the complexity calculation module 110 measures the complexity of points (pixels) within the DC sub-band. (Recall that the DC sub-band was created by the DWT decomposition module 104 from the grayscale image, which was extracted by the grayscale transform module 102 from the original color image.) The complexity calculation or measurement may be made in a manner fitting for the circumstances. For example, a local standard deviation may be calculated for points within the image. The local standard deviation may be calculated within a window W, such as that defined by FIG. 3. In the example of FIG. 1, the complexity calculation module 110 is configured to measure the complexity of each point s(j, k) within an image. Blocks 712-716 show particular examples of how the complexity of an image may be measured, and therefore show different embodiments of block 710. At block 712, complexity of each point within the image is measured. In particular, the complexity of each point is based in part on a window within the image within which the point is located. FIG. 3 shows such a window, within which the complexity of the point s may be measured. At block 714, a complexity map is derived for each point within the image. In particular, each complexity map may be based on a standard deviation of the point with respect to other points also contained within a window defined within the image. At block 716, for each point within the high-energy portion of the image, a window is defined within which the point is located. The high-energy portion of the image may be the DC sub-band. Additionally, for each point within the high-energy portion of the image, a standard deviation is calculated for the point with respect to other points within the window.

At block 718, a quantization step size associated with a point (pixel) in the image is calculated according to the complexity of that point. In a more specific example, a quantization step size may be calculated for a point, or typically each point, in the image, using the local standard deviation of the point as an input to the calculation. In the example of FIG. 1, the quantization step size derivation module 112 is configured to calculate a quantization step size for each point s(j, k) within an image. Blocks 720-724 show particular examples of how a quantization step size may be calculated, and therefore show different embodiments of block 718. At block 720, a larger value for the quantization step size is selected in response to larger variance within a window defined in the image. Similarly, a smaller value for the quantization step size is selected in response to smaller variance within the window defined in the image. At block 722, the quantization step size of each point in a DC sub-band of the image is chosen as a function of a standard deviation of that point, a maximum standard deviation and a maximum allowable quantization step size. In particular, the maximum standard deviation and a maximum allowable quantization step size may be configured as user-defined inputs and/or parameters. At block 724, the quantization step size may be calculated in part as a function of values used for a maximum standard deviation and a maximum allowable quantization step size, which can be configured as user-defined input.

At block 726, a message is embedded into the image using the quantization step size. For example, the message may be embedded into a high-energy portion of the image using the quantization step sizes. Referring to FIG. 1, the mark-embedding module 114 is configured to embed a message into an image using a quantization step size. Blocks 728-734 show particular examples of how a message may be embedded into an image using the quantization step size calculated at block 726, and therefore show different embodiments of block 726. At block 728, data is embedded into a DC sub-band that was derived from a grayscale image, which in turn was derived from a color image. At block 730, more data are embedded into areas of the image wherein variance is greater. Similarly, fewer data are embedded into areas of the image wherein variance is lesser. In one implementation, variance may be introduced into calculations directing the embedding via the quantization step size, which is itself a function of the variance. At block 732, a message is embedded to which an error correcting code and a random permutation have been applied.

At block 734, the DC sub-band portion of the image is inverse-transformed into a grayscale image. Referring briefly to the example of FIG. 1, the inverse DWT and grayscale to color module 116 performs a transform of the DC sub-band into a grayscale image. At block 736, the original chromatic components (e.g. U and V) are used to reconstruct a color image from the grayscale image. Referring briefly to the example of FIG. 1, the inverse DWT and grayscale to color module 116 performs a transform of the grayscale image into a color image.

Figure 8:
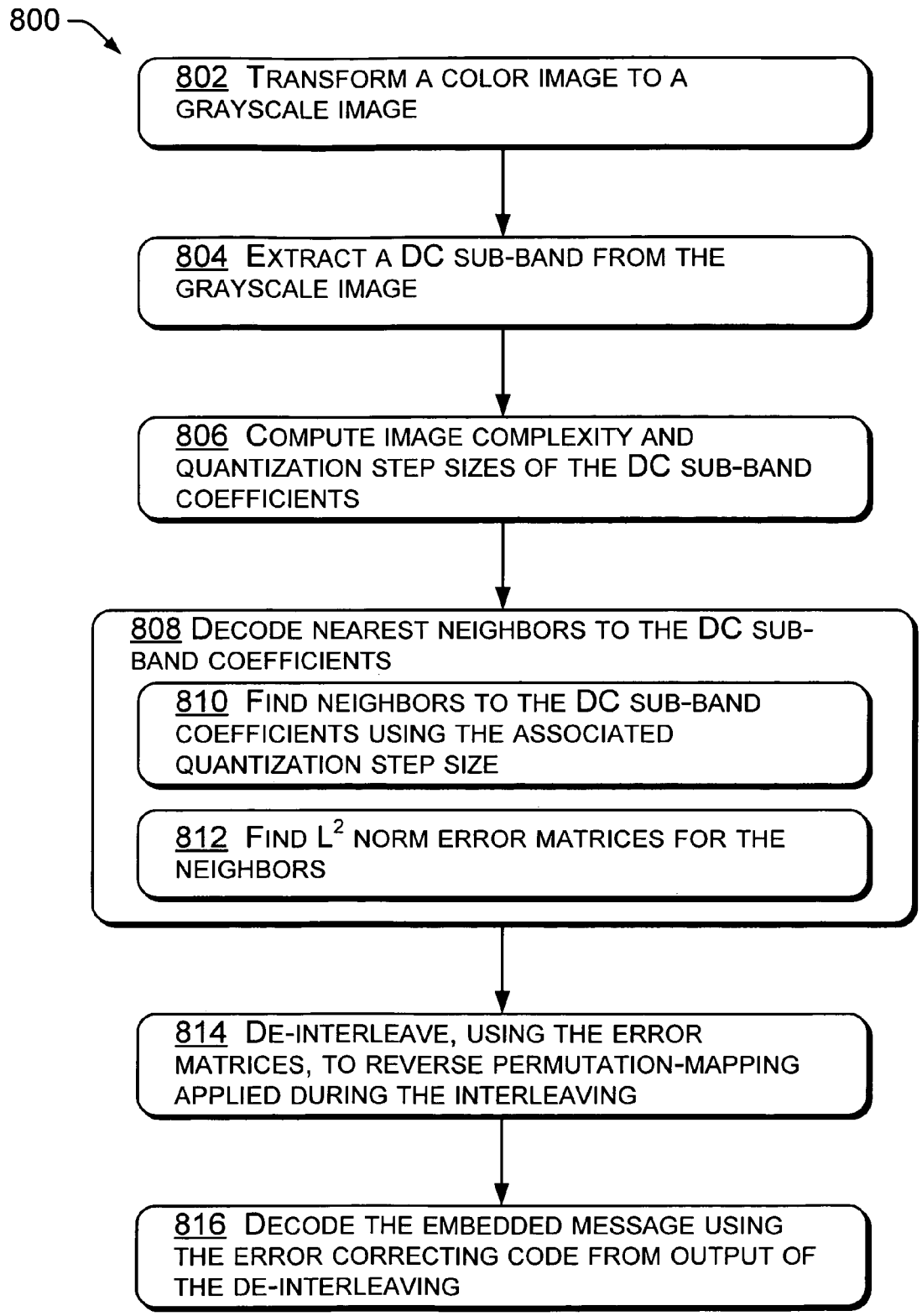
FIG. 8 illustrates an example of operation of a watermark decoding system.

FIG. 8 illustrates an example of a method 800 by which the watermark decoding system 600 of FIG. 6 may be operated. Thus, FIG. 8 explains an embodiment that can extract a possibly embedded message via watermarking from a color (or grayscale) image, such as by using the watermark decoding system 600 of FIG. 6. Such a possibly-embedded message may have been inserted in the color (or grayscale) image by the mark encoding system 100 of FIG. 1, according to the operation described by FIG. 7. At block 802, a color image is converted into a grayscale image. Referring to the example of FIG. 6, the grayscale transform module 602 is configured to convert the color image into the grayscale image. At block 804, a DC sub-band is extracted from the grayscale image. Referring to the example of FIG. 6, the DWT decomposition module 604 is configured to extract the DC sub-band from the grayscale image. At block 806, the image complexity and quantization step sizes corresponding to the DC sub-band coefficients are computed. Referring to the example of FIG. 6, the complexity and quantization step size computation module 606 is configured to compute the complexity of the DC sub-band and to compute the quantization step size associated with each coefficient based on that complexity of that coefficient.

At block 808, nearest neighbors to the DC sub-band coefficients are computed. Blocks 810-812 show greater detail of one example wherein the nearest neighbors could be computed, and therefore show exemplary detail of block 808. At block 810, neighbors to a DC sub-band coefficient of interest are found using the corresponding quantization step size. Referring to the example of FIG. 6, the nearest neighbor decoding module (stage 1) 608 is configured to find neighbors to points in the DC sub-band using the quantization step size. At block 812, the $L^2$ norm error matrices are found. Referring to the example of FIG. 6, the nearest neighbor decoding module (stage 2) 610 is configured to find the $L^2$ norm error matrices.

At block 814, in a 'de-interleaving' process, the error matrices are used to reverse permutation-mapping applied during the interleaving. In an example, in FIG. 6 the de-interleaving module 612 is configured to reverse permutation-mapping, thereby de-interleaving the message extracted from the DC sub-band. At block 816, the decoding stage of the error correction code is applied to the output of the de-interleaving of block 814. Referring to the example of FIG. 6, the soft decoding module 614 is configured to decode using the error correcting code originally applied to encode the message by the ECC encoding module 106.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computing Environment

Figure 9:
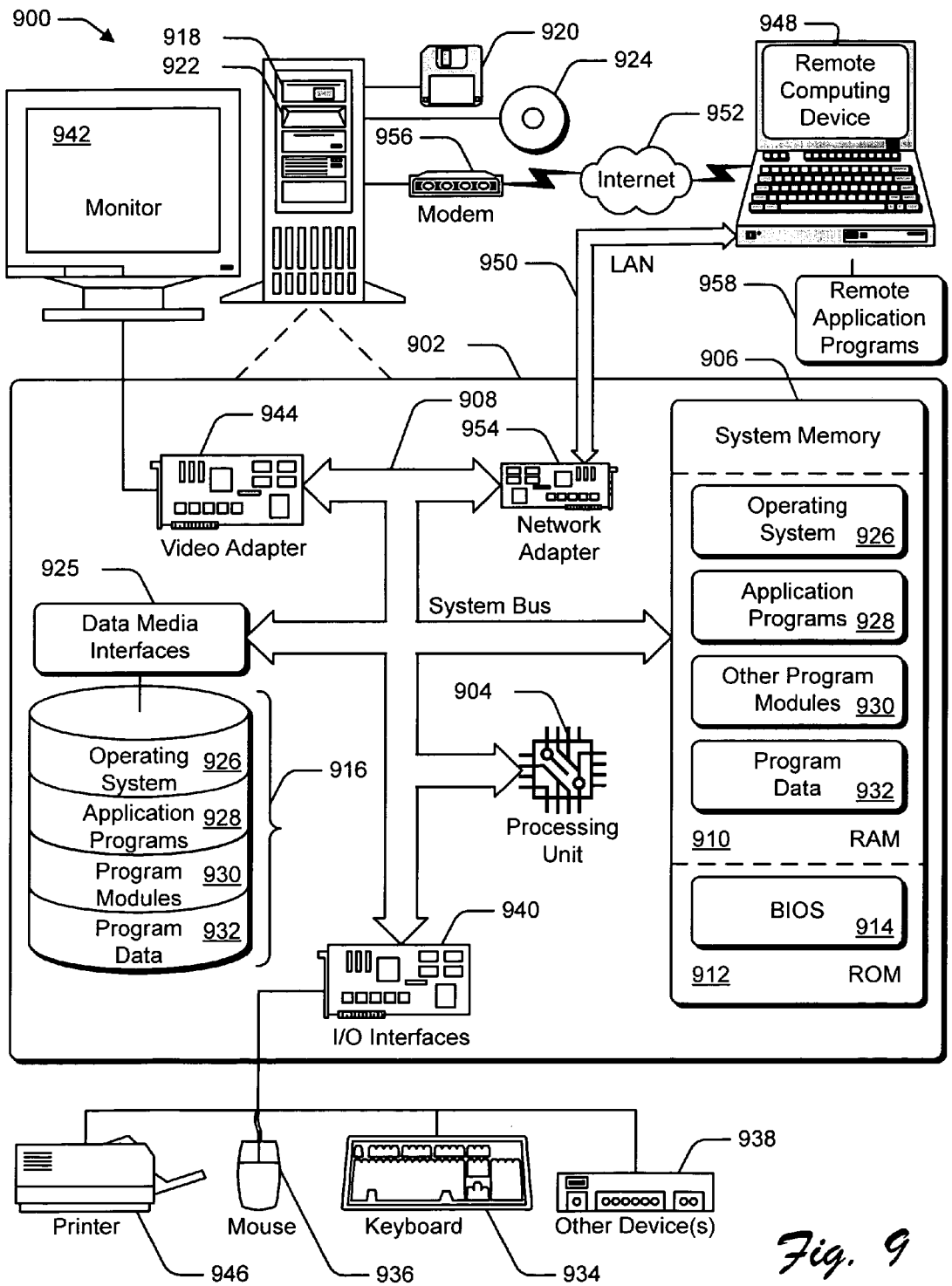
FIG. 9 illustrates an exemplary computing environment suitable for implementing input complexity adaptive quantization watermarking.

FIG. 9 illustrates an exemplary computing environment suitable for implementing watermarking generally, and more specifically input complexity adaptive quantization watermarking. Although one specific computing environment is shown, other computing configurations are possible, and the specific environment is shown as an example only. The computing environment 900 includes a general-purpose computing system in the form of a computer 902. The components of computer 902 can include, but are not limited to, one or more processors or processing units 904, a system memory 906, and a system bus 908 that couples various system components including the processor 904 to the system memory 906. The system bus 908 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 902 typically includes a variety of computer readable media. Such media can be any available media that is accessible by computer 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 can also include other removable/non-removable, volatile/non-volatile computer storage media. By way of example, FIG. 10 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by a SCSI interface (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a caching scheme for user network access information.

Computer 902 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

CONCLUSION

Although aspects of this disclosure include language specifically describing structural and/or methodological features of preferred embodiments, it is to be understood that the appended claims are not limited to the specific features or acts described. Rather, the specific features and acts are disclosed only as exemplary implementations, and are representative of more general concepts.

The invention claimed is:

1. One or more computer-readable storage media comprising computer-executable instructions that, when executed, cause one or more processors to perform steps comprising:
   measuring complexity within an image;
   calculating quantization step sizes according to the measured complexity wherein the calculating comprises:
      choosing the quantization step size for each point in a DC sub-band of the image as a function of a standard deviation of that point, a maximum standard deviation and a maximum allowable quantization step size, wherein the maximum standard deviation and the maximum allowable quantization step size are configured as user-defined inputs; and
   embedding a message into the image using the quantization step sizes.

2. The one or more computer-readable storage media of claim 1, wherein the measuring complexity within the image comprises:
   measuring complexity for each point within the image, wherein the complexity of each point is based in part on a window within the image within which the point is located.

3. The one or more computer-readable storage media of claim 1, wherein the measuring complexity within the image comprises:
   deriving a complexity map for each point within the image; and
   basing each complexity map on a standard deviation of the point with respect to other points also contained within a window defined within the image.

4. The one or more computer-readable storage media of claim 1, wherein the calculating the quantization step size according to the complexity comprises:
   selecting a larger value for the quantization step size in response to larger variance within a window defined in the image; and
   selecting a smaller value for the quantization step size in response to smaller variance within the window defined in the image.

5. The one or more computer-readable storage media of claim 1, wherein the embedding the message into the image using the quantization step size comprises:
   embedding data into the DC sub-band derived from a grayscale image derived from the image;
   wherein the embedding is performed by rounding data a fraction of the quantization step size.

6. The one or more computer-readable storage media of claim 1, wherein the embedding the message into the image using the quantization step size comprises:
   embedding more data into areas of the image wherein variance is greater; and
   embedding less data into areas of the image wherein variance is lesser;
   wherein variance is introduced into instructions for the embedding via the quantization step size.

7. The one or more computer-readable storage media of claim 1, additionally comprising:
   prior to measuring the complexity:
      transforming the image to a grayscale image;
      extracting the DC sub-band from the grayscale image;
      applying an error correcting code to the message; and
      interleaving the message into a matrix of size similar to the DC sub-band; and
   after embedding the message:
      inverse-transforming the DC sub-band to grayscale; and
      using original chromatic components from the image to reconstruct a color image.

8. The one or more computer-readable storage media of claim 7, additionally comprising watermark decoding:
   transforming the color image to a grayscale image;
   extracting the DC sub-band from the grayscale image;
   computing image complexity and quantization step size of the DC sub-band;
   decoding nearest neighbors to the DC sub-band, wherein the decoding comprises instructions for:
      finding neighbors to the DC sub-band using the quantization step size; and
      finding error matrices for the neighbors;
   de-interleaving, using the error matrices, to reverse permutation-mapping applied during the interleaving; and decoding the error correcting code from output of the de-interleaving.

9. One or more computer-readable storage media comprising computer-executable instructions that, when executed, cause one or more processors to perform steps comprising:
- calculating a local standard deviation for points within an image;
- calculating a quantization step size for the points in part by using the local standard deviation of each point wherein the calculating comprises:
  - calculating the quantization step sizes in part as a function of values used for a maximum standard deviation and a maximum allowable quantization step size, which are configured as user-defined inputs; and
- embedding a message into a high-energy portion of the image using the quantization step sizes.

10. The one or more computer-readable storage media of claim 9, wherein the calculating the local standard deviation comprises:
- for each point within the high-energy portion of the image, defining a window within which the point is located; and
- for each point within the high-energy portion of the image, calculating a standard deviation of the point with respect to other points within the window.

11. The one or more computer-readable storage media of claim 9, wherein the embedding the message comprises instructions for:
- embedding the message to which an error correcting code and a random permutation have been applied.

12. The one or more computer-readable storage media of claim 9, wherein the embedding the message comprises instructions for:
- embedding the message into a DC sub-band derived from a grayscale image derived from the image.

13. The one or more computer-readable storage media of claim 9, additionally comprising instructions for:
- prior to calculating the local standard deviation:
  - transforming the image to a grayscale image;
  - extracting a DC sub-band from the grayscale image;
  - applying an error correcting code to the message;
  - applying a random permutation to the message; and
  - reordering the permuted message to a size of the DC sub-band; and
- after embedding the message:
  - inverse-transforming the DC sub-band to grayscale; and
  - using original chromatic components from the image to reconstruct a color image.

14. The one or more computer-readable storage media of claim 13, additionally comprising watermark decoding instructions for:
- transforming the color image to a grayscale image;
- extracting a DC sub-band from the grayscale image;
- computing image complexity and quantization step size of the DC sub-band; and
- decoding nearest neighbors to the DC sub-band, wherein the decoding comprises instructions for:
  - finding neighbors to the DC sub-band using the quantization step size; and
  - finding error matrices for the neighbors;
  - de-interleaving, using the error matrices, to reverse permutation mapping applied during the interleaving; and
  - decoding the error correcting code from output of the de-interleaving.

15. One or more computer-readable storage media comprising computer-executable instructions that, when executed, cause one or more processors to perform steps comprising:
- measuring complexity for a point within an image relative to other points within a window associated with the point;
- calculating a quantization step size for the point using the complexity of the point as an input, wherein the calculating comprises:
  - calculating the quantization step size as a function of a standard deviation of points within a DC sub-band of the image, and as a function of values used for a maximum standard deviation and a maximum allowable quantization step size; and
- embedding a message, using the quantization step size, into the DC sub-band of the image.

16. The one or more computer-readable storage media of claim 15,
- wherein the measuring comprises instructions for:
  - measuring a standard deviation of a point within that point's window, wherein the standard deviation is based on a local variance and a local mean within that window;
- wherein the embedding comprises instructions for:
  - embedding bits of data onto the DC sub-band, wherein the DC sub-band was derived from a grayscale image derived from the image, wherein the embedding is performed by rounding data a fraction of the quantization step size.

17. The one or more computer-readable storage media of claim 15, additionally comprising watermark decoding instructions for:
- decoding nearest neighbors in the DC sub-band, wherein the decoding comprises instructions for:
  - finding neighbors to the DC sub-band using the quantization step size; and
  - finding error matrices for the neighbors.

18. The one or more computer-readable storage media of claim 17, wherein the watermark decoding additionally comprises instructions for:
- de-interleaving, using the error matrices, to reverse permutation mapping applied during the interleaving; and
- soft decoding output of the de-interleaving to remove any error corrective code applied to the message.

* * * * *